United States Patent
Mieth et al.

(12) 
(10) Patent No.: US 6,484,501 B1
(45) Date of Patent: Nov. 26, 2002

(54) METHOD OF HEAT TRANSFORMATION FOR GENERATING HEATING MEDIA WITH OPERATIONALLY NECESSARY TEMPERATURE FROM PARTLY COLD AND PARTLY HOT HEAT LOSS OF LIQUID-COOLED INTERNAL COMBUSTION PISTON ENGINES AND DEVICE FOR EXECUTING THE METHOD

(75) Inventors: Hans Otto Mieth, Hamburg (DE); Peter Thomsen, Quickborn (DE); Marcus Gunther, Mölln (DE)

(73) Assignee: Miturbo Umwelttechnik GmbH & Co. KG, Hamburg (DE)

( * ) Notice: Subject to any disclaimer, the term of this patent is extended or adjusted under 35 U.S.C. 154(b) by 0 days.

(21) Appl. No.: 09/601,503

(22) PCT Filed: Feb. 3, 1999

(86) PCT No.: PCT/EP99/00717

§ 371 (c)(1),
(2), (4) Date: Aug. 2, 2000

(87) PCT Pub. No.: WO99/40379

PCT Pub. Date: Aug. 12, 1999

(30) Foreign Application Priority Data

Feb. 3, 1998 (DE) .......................................... 198 04 105

(51) Int. Cl.⁷ .............................................. F01K 23/10
(52) U.S. Cl. ....................................................... 60/618
(58) Field of Search ............................... 60/618, 39.02; 723/3

(56) References Cited

U.S. PATENT DOCUMENTS 3,830,062 A  *  8/1974  Morgan et al. ................ 60/618

(List continued on next page.)

FOREIGN PATENT DOCUMENTS

DE         2639187 A1  *  3/1978

(List continued on next page.)

Primary Examiner—Thomas Denion
Assistant Examiner—Thai Ba Triou
(74) Attorney, Agent, or Firm—Vidas, Arrett & Steinkraus P.A.

(57) ABSTRACT

The invention relates to a process of heat transformation to convert the low-temperature waste heat from cooling circuits of block-type thermal power station (BTPS) reciprocating-piston combustion engines into steam or other heating media of a temperature required for operation by adopting the principle of the high-temperature heat pump according to which the low-temperature heat produced by recooling the engine cooling circuits to their required inflow temperature required by construction is transferred to a liquid working medium, is absorbed by the working media vapors by partial evaporation, and is brought, by compressing and condensing the working medium vapors, to the temperature of the in-plant heating media and is transferred to them. It is an object of the invention to provide a heat transformation process and devices for realizing the process according to the principle of the high-temperature heat pump using mechanical vapor compression by means of which the waste heat not only of the hot exhaust gas, but also the one of a proproportion as large as possible of the low-temperature waste heat from the cooling circuits for the cylinders, the lubricating oil, and the charging air/fuel mix may be used up to a lower temperature limit to be fixed for each project by conversion into the in-plant common heating medium in a technically reliable manner and at an economical relationship between the investment and operating expenditures to the output from the recuperated energy in reciprocating-piston engine BTPS for the heat supply to commercial and industrial enterprises. This is attained by the fact that inventive connections and devices prevent a drop below the ambient pressure in the critical low-temperature range and in all of the operating conditions of the heat transformer and the energy required for vapour compression is reduced to a minimum and, using steam expansion or hot-air prime movers, is gained completely or in part from the exhaust gas content of the BTPS engine (FIG. 1).

34 Claims, 8 Drawing Sheets

U.S. PATENT DOCUMENTS

| | | | | |
|---|---|---|---|---|
| 4,087,974 A | * | 5/1978 | Vaughan | 60/618 |
| 4,120,157 A | * | 10/1978 | Tang | 60/618 |
| 4,182,127 A | * | 1/1980 | Johnson | 60/618 |
| 4,366,674 A | * | 1/1983 | Eakman | 60/618 |
| 4,366,781 A | * | 1/1983 | Laub | 123/3 |
| 4,576,005 A | * | 3/1986 | Force | 60/618 |
| 5,339,632 A | * | 8/1994 | McCrabb et al. | 60/618 |
| 5,351,487 A | * | 10/1994 | Abdelmalek | 60/618 |
| 5,669,216 A | * | 9/1997 | Ankersmit et al. | 60/39.02 |

FOREIGN PATENT DOCUMENTS

| | | | | |
|---|---|---|---|---|
| DE | 31324007 | | 12/1982 | |
| EP | 0 020 146 | | 12/1980 | |
| EP | 0 033 849 | | 8/1981 | |
| FR | 0 060 159 A1 | * | 9/1982 | 60/618 |
| GB | 2 033 017 A | * | 5/1980 | 60/618 |
| GB | 2 143 589 A | * | 2/1985 | 60/618 |
| WO | WO 87/05361 | * | 9/1987 | 60/618 |

* cited by examiner

FIG. 2.1
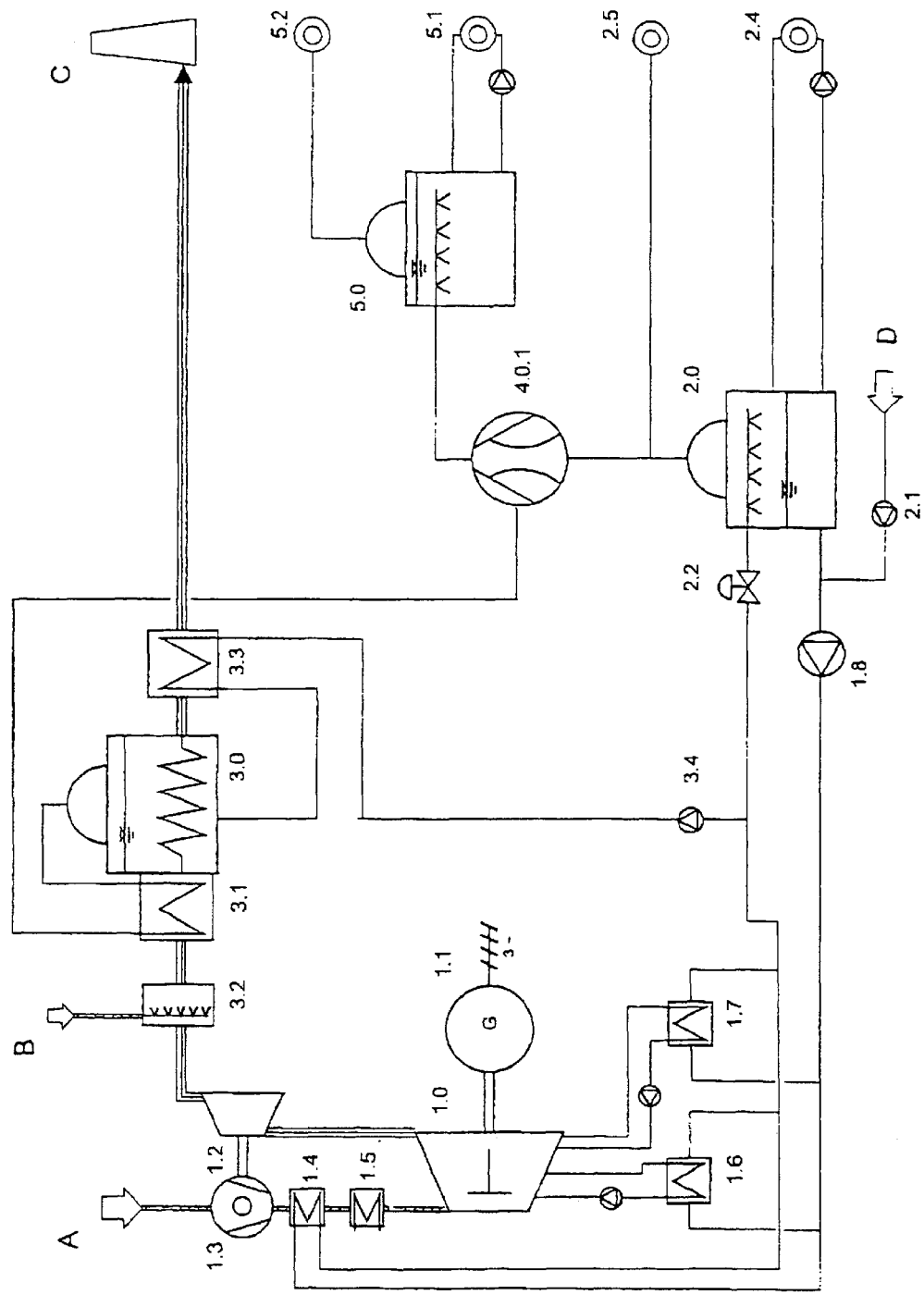

FIG. 2.2
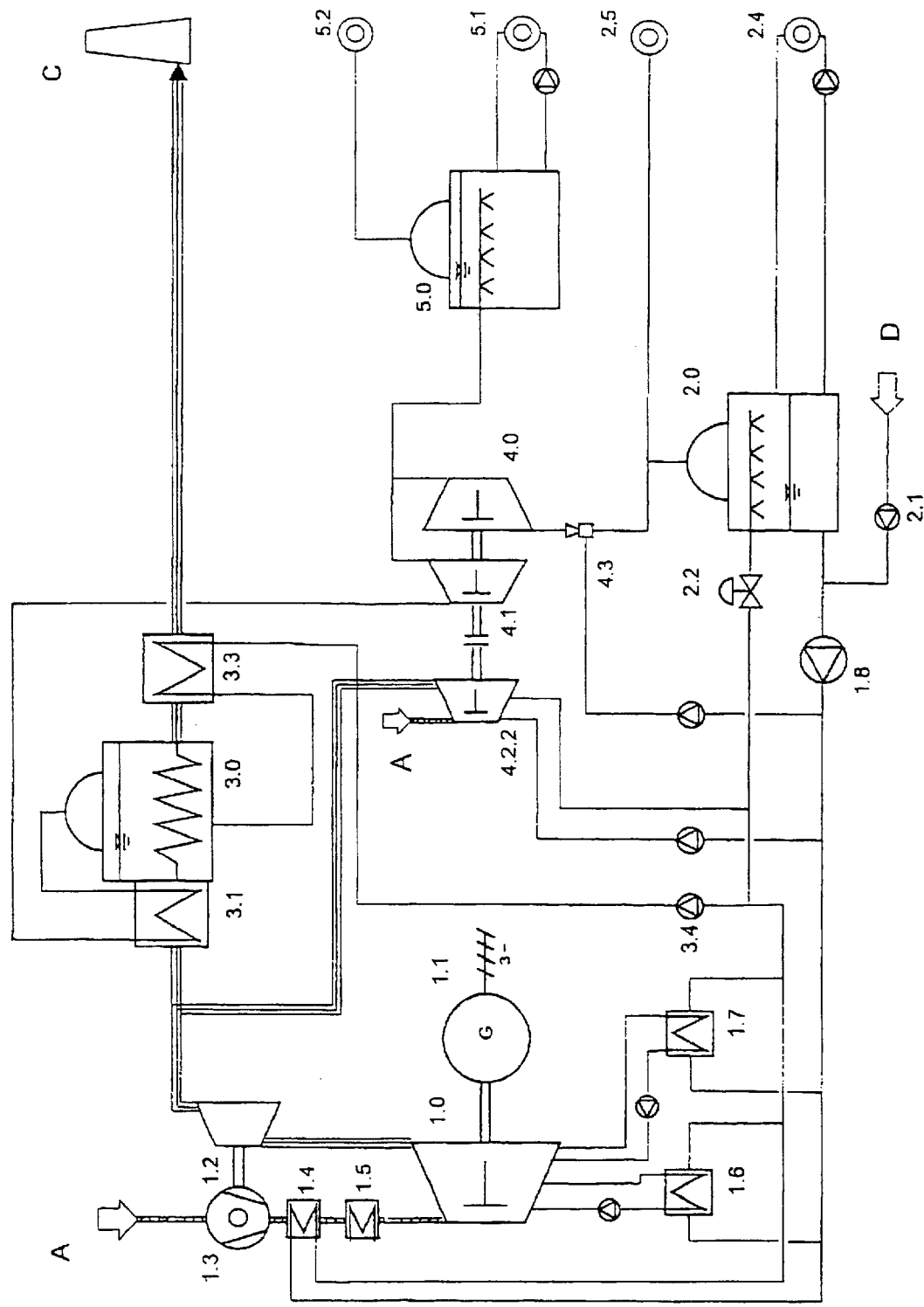

FIG. 2.3
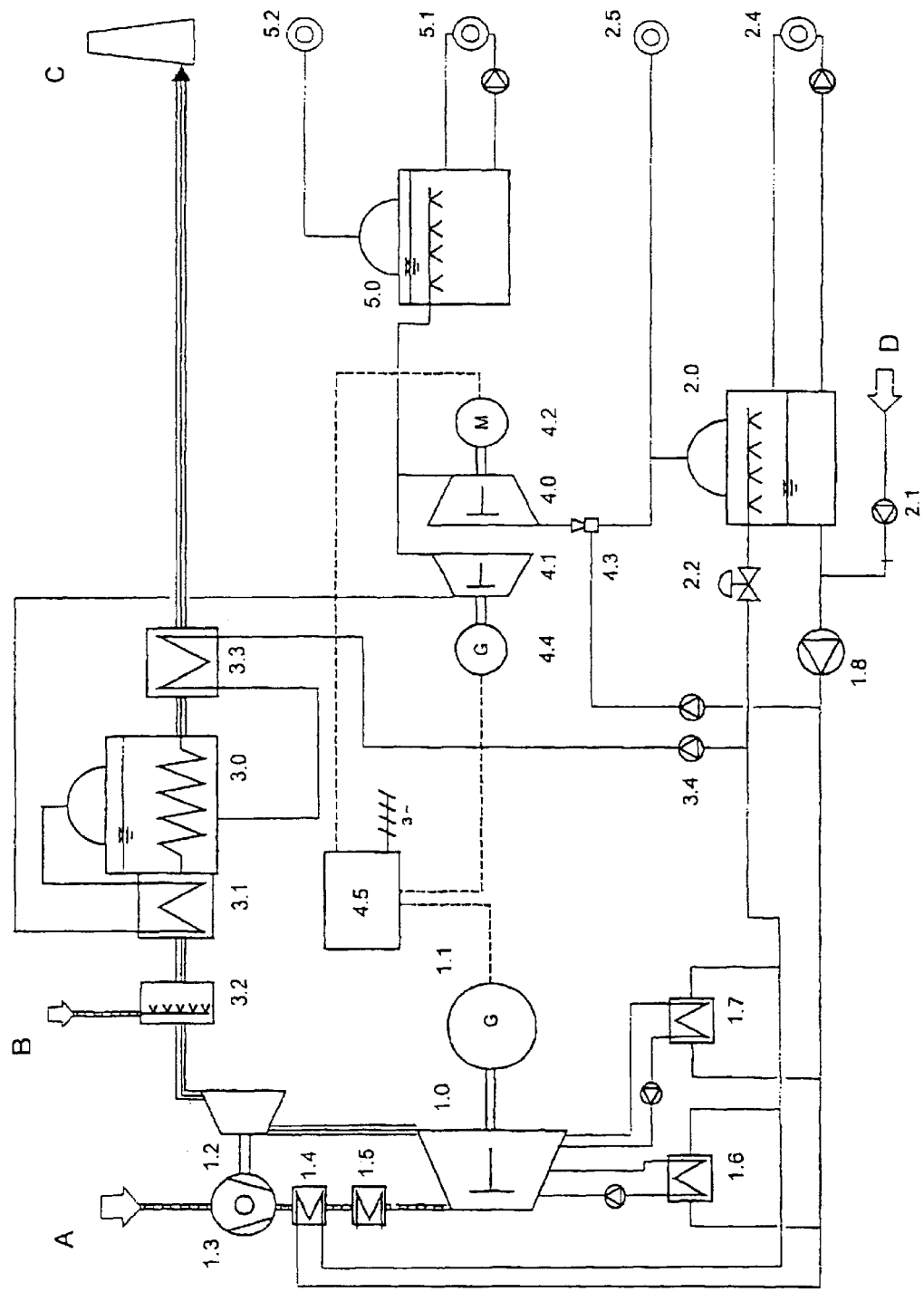

FIG. 3.1
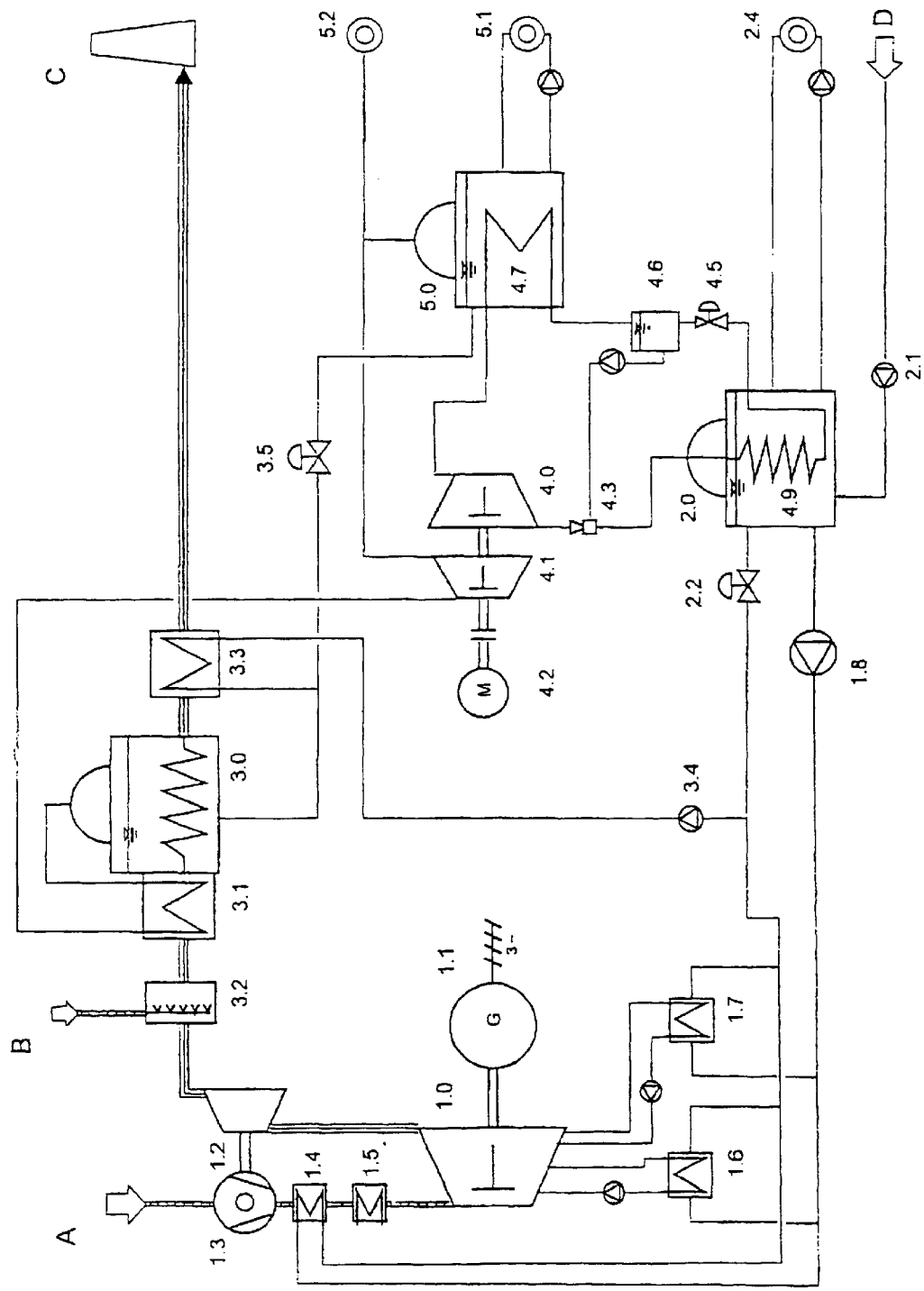

FIG. 3.2
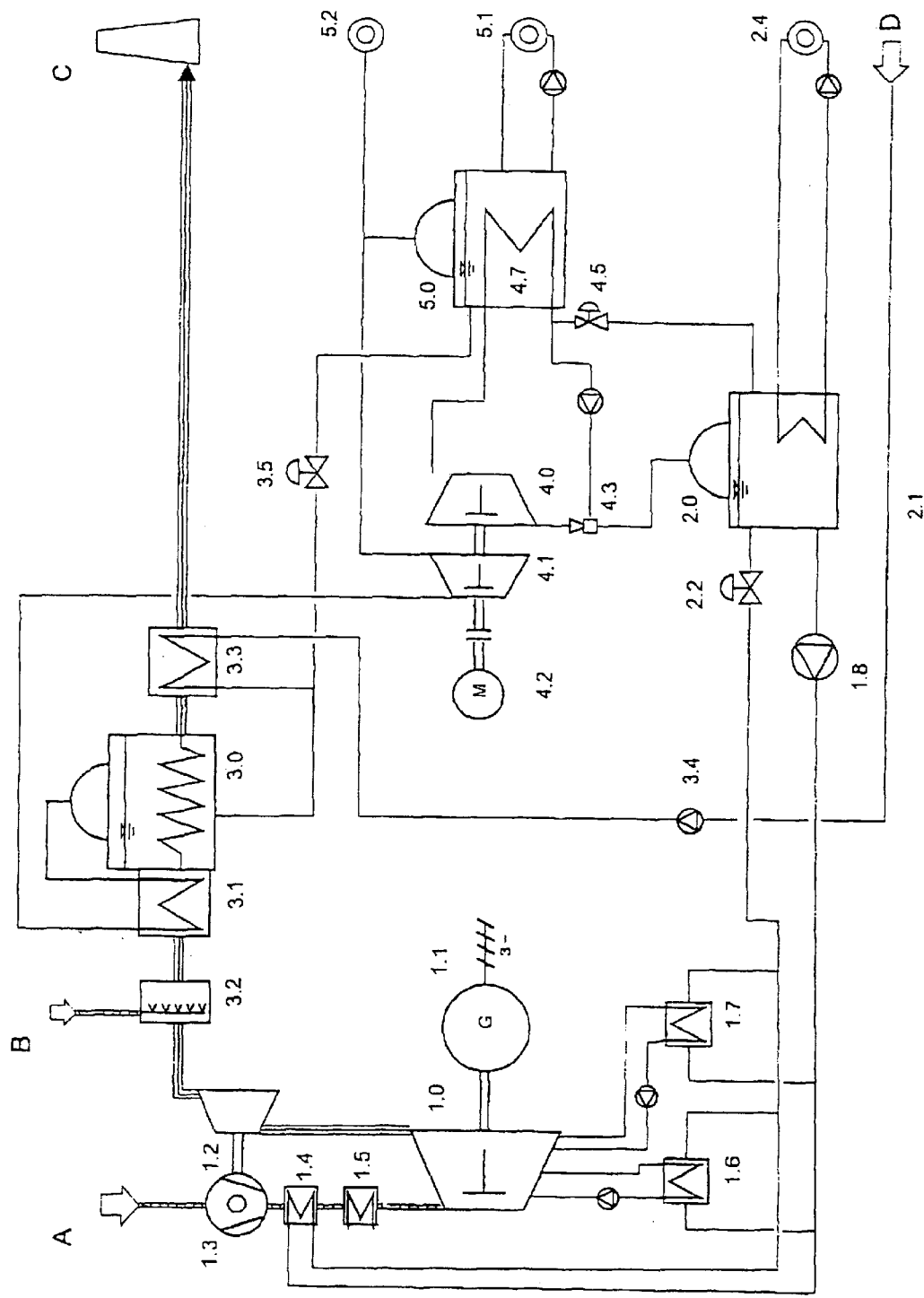

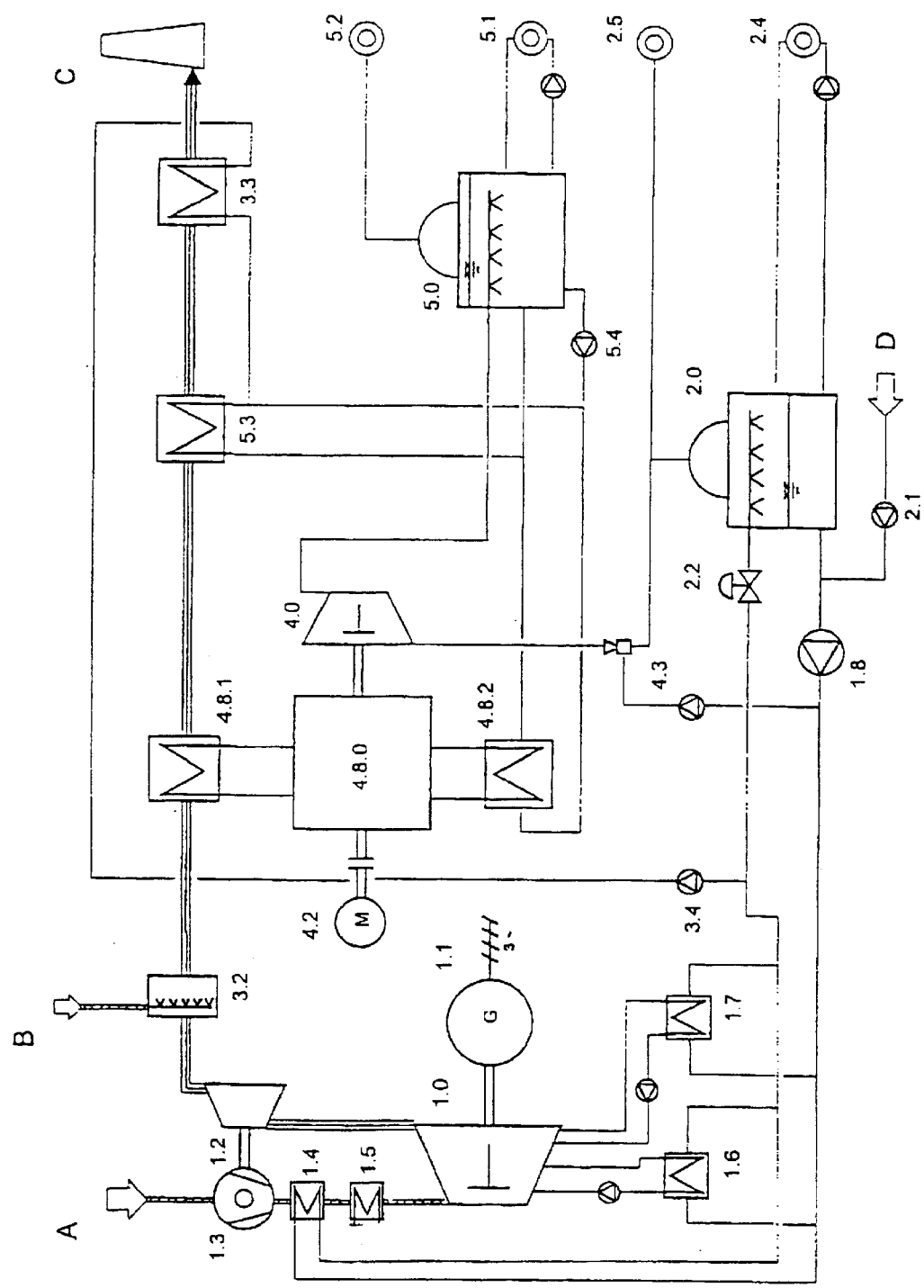
FIG. 4.1

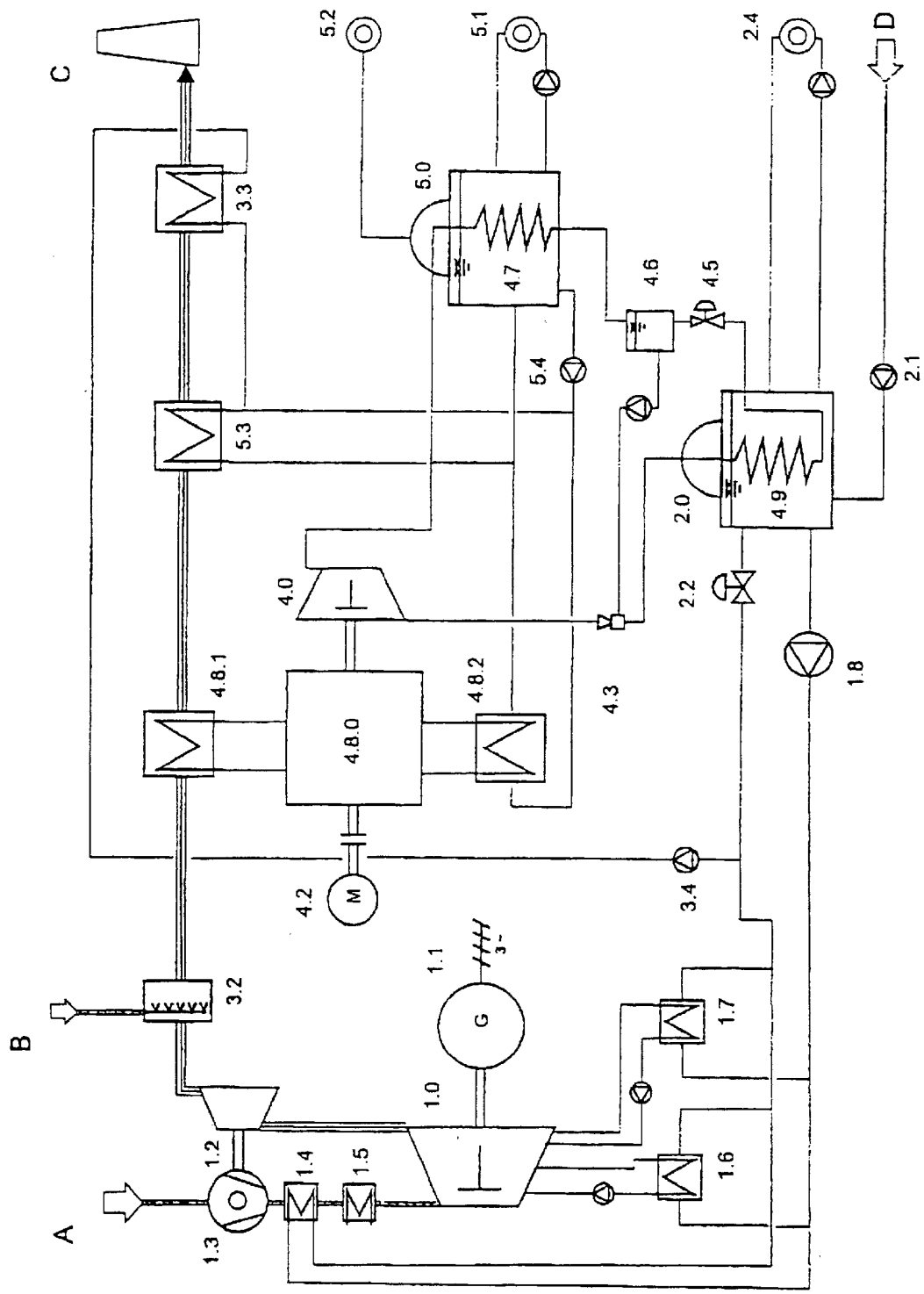
FIG. 4.2

METHOD OF HEAT TRANSFORMATION FOR GENERATING HEATING MEDIA WITH OPERATIONALLY NECESSARY TEMPERATURE FROM PARTLY COLD AND PARTLY HOT HEAT LOSS OF LIQUID-COOLED INTERNAL COMBUSTION PISTON ENGINES AND DEVICE FOR EXECUTING THE METHOD

BACKGROUND OF THE INVENTION

This invention relates to a process of heat transformation to convert the low-temperature waste heat from cooling circuits of block-type thermal power station (BTPS) reciprocating-piston combustion engines into steam or other heating media having a temperature required for operation by adopting the principle of the high-temperature heat pump according to the preamble of claim 1, and devices for realizing the process according to claims 17 to 24.

According to the state of the art, it is known to equip block-type thermal power stations with gas turbine or reciprocating-piston combustion engine drives the waste heat of which is coupled out in heat exchangers and is used for heating purposes. As far as this waste heat is produced in the exhaust gas it may be utilized in a waste-heat boiler to generate heating media at a pressure and a temperature as are required for operation. The low-temperature circuits to cool the charging air, oil, and cylinders of reciprocating-piston industrial combustion engines are designed for an inflow temperature of the cooling water of 70 to 80° C. in the normal case and 110 to 125° C. in special designs and for its heat-up rate by 5 to 10° C. This low-temperature proportion, which comes up to 35 to 50% of the waste heat depending on the fuel and the construction of the engine, constitutes the limiting factor for the use of engine-powered BTPS in technical process industrial plants in many cases because it cannot be utilized to a sufficient degree in the plant. Although reciprocating-piston engines have a better mechanical/electrical efficiency factor, a more favourable behaviour under part-load and, because of the lower air surplus, a lower loss in the chimney of the waste-heat boiler industrial power/heat coupling plants are predominantly equipped with gas turbines the whole usable waste heat produced at a high temperature in the exhaust gas may be universally employed to heat the in-plant processes. Since gas turbines will present a good price-performance ratio only when in larger units and are dependent on high, uniform heat release because of their bad behaviour under part-load using them in small-size or medium-size plants is mostly uneconomical so that their power/heat coupling potentials which are downright interesting both economically and ecologically still are not fully exploited in many cases. Engine-powered BTPS which are used, in spite of the problems shown, in a few industrial enterprises exhibiting a particular ecological engagement are predominantly connected in such a way that low-temperature waste heat is used, as far as possible, to heat buildings or, if absorption cold-water units are connected therebetween, also to cool and air condition buildings where heating water of 70/90 or 110/125° C. can be managed with as a maximum. The technical and organizational expenditure for the direct use of the low-temperature waste heat as a second heating medium in partial regions of commercial establishments and industrial enterprises, however, is so considerable and synchronizing the production and consumption by the various thermal energy carriers is so difficult that the "emergency cooling" of the energine needs to be turned on and the utilization of the "lower-value" low-temperature waste heat has to be dispensed with relatively often in the superior interest of meeting the steam and current demand in spite of careful works management.

In view of the problems depicted, efforts are made on the side of some engine producers to step up the admissible cooling-water inflow temperatures to the range of from 110 to 125° C., on one hand, but a great number of authors have reported on researches and attempts to raise the low-temperature waste heat to an in-plant utilizable temperature level by means of high-temperature heat pumps using mechanical vapour compression or heat transformers according to the principle of absorption technology, on the other. However, success has passed hitherto beyond some single applications only in a few fields the common denominator of which is a relatively low raise in temperature because simple no-oil compressors which are not too expensive are available for pressure differentials of max. 1 bar and the ratio between recuperated energy and the one required for driving (calorific value, efficiency factor) is attractive economically.

Such applications are found, for example, on the "wort coppers" in brewing houses where large volumes of water evaporate at an ambient pressure or pressure slightly above it, are compressed by about 0.5 bar by means of compressors which mostly are mechanical or occasionally are even steam-jet vapour compressors, and are re-used immediately and via the shortest way possible, in very largely dimensioned heat exchangers just to fire the wort copper from which they were evaporated a few instants before. A report was made about this as early as in 1981 by W. STRUCK in his article "Möglichkeiten und Grenzen von Hochtemperatur-Wärmepumpen", published in volume VII of the series "Wärmepumpentechnologie" of the Vulkan Verlag, Essen, rating the degree of primary energy utilization of the gas engine driven plant therein at the considerable factor 5.3. It is from the same source that the description of a BTPS may be taken, which uses recooling of the engine cooling water to 75° C. by partial evaporation at a saturation pressure of 0.4 bar and vapour compression to 2.7 bar, which corresponds to a temperature of 130° C. of the heating medium (which is steam in this case). Such plants which already come very close to the subject matter of the present application for a protective right, however, have not pushed their way in practice because the relationship between the mechanical energy to be employed to the recuperable thermal energy is not correct either ecologically or economically and the water/steam range of the plants which is open to the engine cooling circuit, and even at a negative pressure, on one hand, and to the heating circuits of the plant, on the other, poses serious sealing and maintenance problems.

From U.S. Pat. No. 4,803,958, a process to "pump" the waste heat from the cooling circuit of a combustion engine into steam of a higher temperature by means of a high-temperature heat pump powered by the heat content of the combustion engine exhaust gases has become known wherein the working medium withdrawn from the cooling circuit (water) is evaporated directly. The heat pump is configured as an absorption heat pump in this application and causes the working medium vapours to be compressed by absorption in an absorber, pumping of the solution to the desorber pressure, and desorption in a desorber by means of the heat content of the exhaust gases of the combustion motor.

SUMMARY OF THE INVENTION

On the basis of the depicted state of the art, it is an object of the invention to provide a heat transformation process and devices for realizing the process according to the principle of the high-temperature heat pump by means of which the waste heat not only of the hot exhaust gas, but also the one of a proportion as large as possible of the low-temperature waste heat from the cooling circuits for cylinders, the lubricating oil, and the charging air/fuel mix may be used up to a lower temperature limit to be fixed for each project by conversion into the in-plant common heating medium in a technically reliable manner and at an economical relationship between the investment and operating expenditures to the output from the recuperated energy in reciprocating-piston engine BTPS for the heat supply to commercial and industrial enterprises.

Specifically, it is the processes and devices according to the teachings of claims 3, 5, 6, and 7 which meet the requirement of technical reliability by avoiding designs affected by high risks of operation, maintenance, and repair such as a negative pressure in the low-pressure area of the heat transformer or direct supply of the engine cooling water to the in-plant heating medium.

According to the invention, an economical relationship of the investment and operating expenditures to the yield and output of the heat transformer is aimed at by the fact that according to the teachings of claims 3 and 7 to 13, the waste heat produced in the low-temperature range is treated and selected in such a way that its recuperation may be performed to the largest extent possible (heat volume) and in the best quality possible (temperature), which is aimed at achieving an optimum thermal efficiency factor without recurring to the mechanical/electrical efficiency factor or by recurring to it as little as possible, according to the teaching of claim 12, the power demand for vapour compression is minimized by an extensive utilization of the low-temperature waste heat in the non-treated condition of its production, and according to the teachings of claims 1 and 14 to 23, the energy for the heat transformation of the low-temperature waste heat is provided, to an available extent, from the higher-value engine waste and at least a recourse to high-quality mechanical and/or electrical energy fir vapour compression and the concomitant reduction of the BTPS mechanical/electrical efficiency factor are avoided.

Hence, the invention has the following substantial advantages:

1. Reciprocating-piston engine BTPS with their mechanical/electrical efficiency factor superior to that of the gas turbine BTPS and with their more favourable behaviour under part-load may also be used, while permanently and completely utilizing the waste heat for power/heat coupling, upon installation of the proposed heat transformer, also in those plants, which do not have a sufficient demand (i.e. no demand equivalent or time-synchronized to their power and steam consumption or, generally stating, their high-temperature heating medium consumption) for the low-temperature waste heat produced in the BTPS cooling circuits.

2. As a result of driving the heat transformer which is fully or partly effected by utilizing the energy of the engine exhaust gas according to the proposed processes and devices, the mechanical/electrical efficiency factor of a power/heat coupling plant is not diminished at all or is diminished far less than if electrically or mechanically driven high-temperature heat pumps are used according to known processes and devices.

3. The protection against the penetration of air and/or oil resulting from leakages in the low-temperature range from the engine cooling circuits to the vapour compressor of the thermal transformer, which is brought about by measures to avoid any negative pressure in the high-temperature heat pump and the in-plant heating system remedy the serious process and construction-related reliability lacks of the high-temperature heat pump BTPS which have been known hitherto according to the state of the art.

4. The technical advantages of the reciprocating-piston combustion engine BTPS including the proposed heat transformer make it economically useful to employ the ecologically worthwhile power/heat coupling in a multiplicity of preponderantly small-sized and medium-sized commercial establishments and industrial enterprises the heating power demand of which for gas turbine BTPS is too low and/or too non-uniform and which, apart from their steam demand for the low-temperature waste heat of common reciprocating-piston BTPS, have no sufficient and time-synchronized use therefor.

Aspects of the invention relate, amongst other things 1. a process of low-temperature heat recuperation which makes it possible to gain the waste heat from a proportion as large as possible of the BTPS engine cooling circuits at a temperature which is so far above the boiling-point of the heat transformer working medium that there is no drop below the ambient pressure in any point of vapour evaporation and compression. This ensures that leakages due to media exiting to the outside are signaled and suction of air or oil into the working medium are prevented and that a high suction pressure advantageous for the power demand for vapour compression and a low suction volume of the working-medium steam favourable for the construction expenditure of the compressor are achieved and an expensive sealing against a negative pressure are avoided;

2. a process of vapour compression and heating power provision in the high-pressure region of the heat transformer according to the criteria of para 1 such that the energy required for vapour compression from the saturation pressure of low-temperature heat recuperation to the saturation pressure of the in-plant heating medium is gained as far as possible from the heat content of the engine exhaust gas by converting it into superheated high-pressure motive steam and expanding it to the pressure of the in-plant heating medium while being deprived of compression work or by using it for driving a hot-air prime mover according to the Stirling principle.

Embodiments of the invention for realizing the process according to the invention are shown in the drawing and are described below.

BRIEF DESCRIPTION OF THE DRAWINGS

FIG. 2.1 shows a schematic representation of an engine BTPS including a heat transformer modified by a steam-jet compressor as against FIG. 1;

FIG. 2.2 shows a schematic representation of an engine BTPS according to FIG. 1 including a heat transformer the mechanical compressor of which is powered by a steam-expansion prime mover having an additional combustion engine;

FIG. 2.3 shows a schematic representation of an engine BTPS according to FIG. 1 including a heat transformer the mechanical compressor of which is powered by an electric motor which is supplied with power from a generator of the steam-expansion prime mover;

FIG. 3.1 shows a schematic representation of an engine BTPS in combination with a heat transformer which is modified in such a way that it is fed with a heat pump low-boiling working medium FIG. 3.2 shows a schematic representation of an embodiment of the heat transformer which is modified in the area of a heating power medium-pressure boiler;

FIG. 4.1 shows a schematic representation of an engine BTPS in combination with a heat transformer having a Stirling engine to drive the vapour compressor, and FIG. 4.2 shows another schematic representation of a device according to FIG. 4.1 wherein a heat pump low-boiling working medium is used to operate the heat transformer.

DETAILED DESCRIPTION OF THE INVENTION

Figure 1:
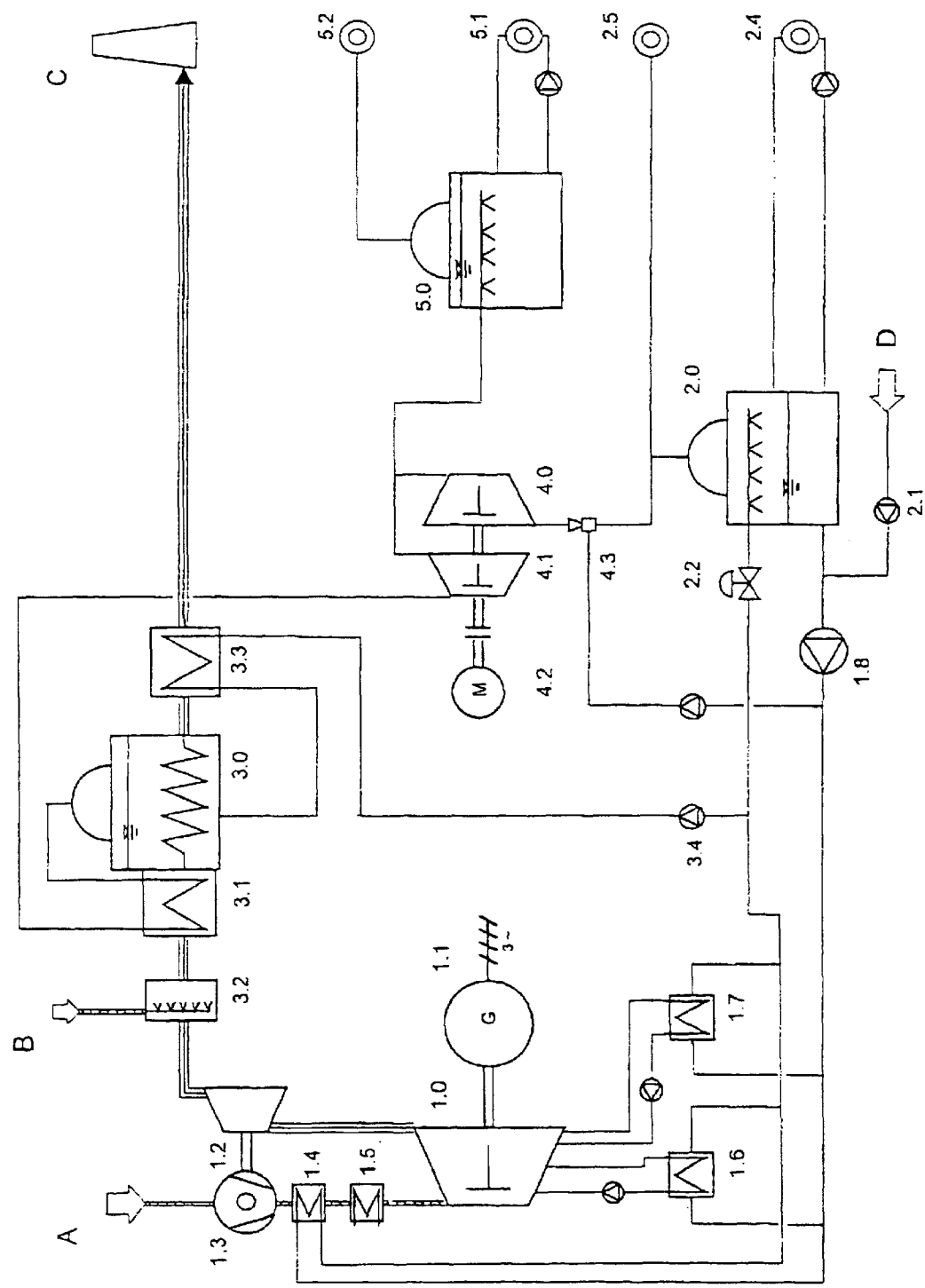
FIG. 1 shows a schematic representation of an engine BTPS in conjunction with a first embodiment of a heat transformer according to the invention.

Referring to FIG. 1, the devices are broken up into a BTPS engine 1.0 with its sub-units 1.1 to 1.8, a low-pressure boiler and vapour evaporator 2.0 to 2.5, a waste Referring to FIG. 1, the devices are broken up into a BTPS engine 1.0 with its sub-units 1.1 to 1.8, a low-pressure boiler and vapour evaporator 2.0 to 2.2 and 2.4 to 2.5, a waste heat motive-steam high-pressure boiler 3.0 to 3.4, a vapour compressor with a drive 4.0 to 4.2, and a medium-pressure heating boiler 5.0 to 5.2. heat motive-steam high-pressure boiler 3.0 to 3.4, a vapour compressor with a drive 4.0 to 4.2, and a medium-pressure heating boiler 5.0 to 5.2.

Before details thereof are entered into brief descriptions will follow for the systems according to the state of the art with reference to FIG. 1 to elucidate the innovations and improvements according to the teachings of the invention.

A standard BTPS of the construction type common for a building heating is only composed of structural units similar to 1 and 2 of FIG. 1, which are connected so that the exhaust gas from the BTPS engine is passed, behind an exhaust gas turbo-supercharger 1.2/1.3, through a waste heat boiler 2.0 in which the pre-heated cooling water from the low-temperature engine cooling circuits 1.4 and 1.5 mostly connected in a series in such plants (high-temperature and low-temperature stages of the cooler for the fuel/air mix (A) charged by the exhaust gas turbo-supercharger 1.2/1.3; engine oil cooling 1.6, and cylinder cooling 1.7) is re-heated to the feed flow temperature of the heating boiler(s) 2.4. Since the temperatures do not generally exceed 80° C. such BTPS reach high waste heat utilization levels which are below the thermal efficiency factor of good heating boilers solely because of the air excess of 1.5 to 2.0 required in the so-called lean-mix (turbo)-engine. This drawback can be avoided in using "lambda1" engines having controlled catalysts which, however, are more expensive than lean-mix turbo-engines having exhaust gas turbo-superchargers because of the lower specific output. Economy and ecology are still in a controversy here which, unfortunately, is mostly decided on to the disfavour of the latter because of the current-/heat price relation.

Common engine BTPS for industrial or commercial applications are composed of structural units similar to 1, 2, and 5 of FIG. 1, which are connected so that the heating boiler 5.0 designed for an excess pressure corresponding to the temperature of the in-plant heating medium is solely heated by the exhaust gas and the utilization of the cooling water collected in a tank corresponding to boiler 2.0 is either regulated separately or the waste heat is run "across the roof" for cooling water recooling because there is no demand for heating power of this temperature stage. If the engine's electric efficiency factor is from 35 to 40 5 and the respective usable-heat production is about 20% in the exhaust gas and the cooling water the overall efficiency factor, if the low-temperature waste heat is dispensed with, is as low as 60% of the fuel energy employed, i.e. is very close to the margin of fiscal acceptance as a power/heat coupling plant.

Although BTPS plants using a high-temperature heating pump for the recovery of cooling-water heat by vapour compression according to the state of the art achieve a better thermal efficiency factor which is close to 40%, they have to spend so much driving energy in driving the compressor that the electric efficiency factor of the BTPS decreases by about 5 to 30 to 35%, for example, in the case of the arrangement described by STRUCK. STRUCK's connection presents itself in a way similar to FIG. 1 with regard to the BTPS engine 1.0 and its cooling circuits 1.4 to 1.7 as well as the low-pressure boiler 2.0, the vapour compressor 4.0 with its driving engine 4.2, and also the medium-pressure heating boiler 5.0 to 5.2, but the motive-steam high-pressure boiler 3.0 to 3.3 and the steam engine 4.1 are omitted; and the exhaust gas is passed through the heating boiler 5.0. Another important difference from the inventive system is that suction of oil and air into the high-temperature heat pump and the in-plant heating circuit will occur in case of leakages because of the absence of the heat exchanger 1.7 and the negative pressure of 0.4 bar in the low-pressure boiler 2.0 and the engine which is directly connected thereto, which gives rise to substantial reservations to using such systems.

BTPS plants using gas turbines, because of the absence of exploitable low-temperature waste heat, are only composed of the driving engine similar to the structural units 1.0, 1.1, 1.2, and 1.3, and of a waste heat boiler similar to the structural units 3, which are designed for the operating pressure required for the heating medium and are equipped with heating circuits according to 5.1 and/or 5.2. The mechanical/electrical efficiency factor of advanced industrial gas turbines rises from 20 to 30% from 0.6 to 3 MW and just reaches under 35% at 10 MW. While the thermal efficiency factor and the simple plant structure are favoured by the supply of nearly the whole waste heat in the exhaust gas, it is diminished, on the other hand, by a high loss in the chimney (at (C)) in the order of magnitude of 20% because of the high surplus of air $\lambda=4$ which currently is still owing to the technical materials and construction used. It is true that reheating it in the exhaust gas flow according to structural unit 3.2 allows to reduce the loss in the chimney up to one third of the 20% indicated, but the current index of the plant will then decrease to the same extent. Hence, this means is only useful to the extent to which the heat demand for operation temporarily exceeds the waste heat supplied by the gas turbine. If this condition occurs permanently the gas turbine BTPS has been designed to be so meager that the ecological waste heat utilization or power/heat coupling potentials of the plant works are not fully exhausted.

The inventive engine BTPS with a heat transformer (FIG. 1), in contrast to the described BTPS according to the state of the art, is equipped with all main structural units 1.0 to 5.0, but is not necessarily fitted always with all of their structural sub-units. As far as there are alternatives to the level of equipment shown in FIG. 1 these will be described in a context with the level of equipment shown and, unless these can be clearly described verbally, are provided with more illustrations. To avoid imitations it should be noted here that the term. "heat transformer" does not signify a numberable structural unit of the plant, but the entity thereof with the exception of structural unit 1. The term has been preferred to that of a high-temperature heat pump to characterize the integration of a set of structural units extended with respect thereto to the comprehensive function of the heat transformer.

Structural Unit 1:

The reciprocating-piston combustion engine 1.0 with an electric generator coupled thereto 11. What is shown is a lean-mix turbo-engine including a gas turbine 1.2 and a fuel-air mix turbocompressor 1.3 coupled thereto as are realized for a gas engine. The turbo-supercharger would only compress air in engines using liquid fuel injection whereas the exhaust gas turbo-supercharger inclusive of the charging air or mix coolers 1.4 and 1.5 is omitted in suction engines. The subdivision of coolers 1.4 and 1.5 is made, according to claim 8, in such a way that the compression heat is transferred in the charging air or mix cooler 1.4, with an inevitable temperature differential left, to the cooling water circulated by a pump 1.8 from a low-pressure boiler 2.0. The low-temperature cooler 1.5 is connected to an external cooling-water supply.

The reciprocating-piston combustion engine 1.0 with an electric generator coupled thereto 11. What is shown is a lean-mix turbo-engine including a gas turbine 1.2 and a fuel-air mix turbocompressor 1.3 coupled thereto as are realized for a gas engine. The turbo-supercharger would only compress air in engines using liquid fuel injection whereas the exhaust gas turbo-supercharger inclusive of the charging air or mix coolers 1.4 and 1.5 is omitted in suction engines. The subdivision of coolers 1.4 and 1.4 is made, according to claim 8, in such a way that the compression heat is transferred in the charging air or mix cooler 1.4, with an inevitable temperature differential left, to the cooling water circulated by a pump 1.8 from a low-pressure boiler 2.0. The low-temperature cooler 1.5 is connected to an external cooling-water supply.

In the advantageous aspect of claim 1, the cooler 1.5 is dispensed with while the concomitant power loss of engine 1.0 is accepted in order not to "cool off" the heat volume dissipated there in the order of 5% of the fuel heat throughput, but to incorporate it into exhaust gas utilization. The further advantage resultant in the context of claim 1 is that the exhaust gas energy available for vapour compression increases. The two effects turn out even more favoured if a "lambda 1" suction engine is employed in which even the heat volume from cooler 1.4 of low-pressure boiler 2.0 is transferred into the exhaust gas while decreasing the power demand of the vapour compressor 4.0 and increasing the supply of driving power at the same time. In addition, as engine charging is dispensed with the surplus of air and, therefore, the loss in the chimney which is directly dependent thereon are decreased proportionally and the thermal efficiency factor is increased.

The heat exchanger 1.7 is provided for the case that a separation of media between the working medium of the heat transformer and the cylinder cooling circuit of the engine 1,0 is explicitly desired or technically required, e.g. for safety considerations with regard to the risk of the heating medium getting contaminated with engine oil, which is considered particularly critical in food-processing factories. This could occur if claim 7 cannot be realized according to which the cooling-water temperature of the engine 1.0 is raised to 115 to 125° C. in order to ensure by water as the heat transformer working media that the plant is above ambient pressure within the entire low-temperature range and, according to claim 4, that the alternative working media to be used in this case which has a lower boiling point is out of question for use as an engine coolant for chemical or technological risk reasons such as combustibility or corrosiveness.

In an oil cooler 1.6, about 5% of the waste heat are produced like in the cooler 1.5. If the cooling-water inflow temperature is raised to 115 to 125° C. according to claim 7 it is necessary to further develop the engine 1.0 according to claim 9 so that if an appropriate lubricating oil is used at an oil temperature of about 120 to 130° C. it may operate without prejudice to its power and service life. Nowadays, there are engines already which either allow for hot cooling according to claim 7 or for operation using oil temperatures of from 120 to 130° C. according to claim 9. Therefore, a combination of the two properties can only be a problem of the expenditure for development or the homologation which has not been required in this form hitherto. The fact that the BTPS engines were not originally developed for use in power/heat coupling plants and were always optimized with priority given to a high mechanical/electrical efficiency factor in default of a consequent overall consideration and while neglecting and, in part, even obstructing waste heat usability will explain that such fundamental innovations which have such a decisive impact on their economy and ecological effect are still possible after so many years of BTPS construction.

Structural Unit 2:

The low-pressure boiler of the heat transformer is composed of the tank 2.0 the process technological functions of which are the partial evaporation of the working medium liquid drawn off by a pump 2.1 and held, in an interaction with a pressure-maintaining valve 2.2, above the saturation pressure at the highest overheating temperature occurring in the engine cooling circuits 1.4, 1.6, and 1.7 and returned to the low-pressure boiler 2.0 while diminishing its pressure via the pressure-maintaining valve 2.2 and evaporating it, as well as the discharge of residual liquid from the resultant working medium vapour before it enters a suction line of the vapour compressor 4.0. Moreover, the low-pressure boiler 2.0 serves as an accumulator and regulated-level run-down unit of the BTPS plant for feed water and condensate from an external in-plant tank and as a steam and hot-water supply to in-plant low-temperature users 2.4 and 2.5.

Structural Unit 3:

The motive-steam high-pressure boiler of the heat transformer is composed of the waste heat steam generator 3.0 including an upstream superheater 3.1 disposed on the exhaust gas side and the downstream economiser (feed water preheater) 3.3 including a feed pump 3.4 controlled by the filling level of the steam generator 3.0. The steam generator 3.0 and its secondary units 3.1 to 3.4 are designed first in dependence on the exhaust gas temperature of the engine 1.0, second on the quality and quantity of the low-temperature waste heat, third on the specific in-plant heating-power pressure and, fourth, on the power demand for vapour compression resulting from these data, and on their drives. If these preset data present a deficiency in the heating power supply in the engine gas as against the power demand for vapour compression a beneficial measure potentially consists in installing an extra burner 3.2 in the exhaust gas flow from the engine 1.0 to the motive-steam boiler 3.0 according to claim 2. Alternatives thereto are set forth in conjunction with vapour compression and are discussed in a context with optimizing the heat transformer.

Structural Unit 4:

The vapour compression plant of the heat transformer, according to FIG. 1, is composed of a mechanical compressor 4.0 coupled to a steam expansion prime mover 4.1 and an extra drive 4.2. This configuration in itself represents a practically inappropriate combination of attempted solutions according to claims 1, 2, 20, 22, and 17. As far as the real arrangements can be clearly described and discussed by simply omitting structural units in FIG. 1 it will be done below. Structural unit configurations which strongly deviate therefrom are illustrated in FIGS. 2.1 to 2.3.

FIG. 2.1 shows a heat transformer including a steam-jet compressor 4.0.1, composed of the motive-steam high-pressure boiler plant 3.0, 3.1, 3.2 with an extra burner 3.2 according to claim 2 and the steam-jet compressor 4.0.1 according to claim 17. In conjunction with steam-jet compression, there is no alternative to an increase in motive-steam supply by the inventive extra burner 3.2. It is specifically at a high compression ratio that the steam-jet compressor 4.0.1 has a efficiency factor worse than that of mechanical compressors. Since its cost of purchase and maintenance is low and does not represent any risk of contamination for the steam its use should be taken into account, however, whenever the marginal conditions are favourable as to the compression and volume ratios of the low-temperature and high-temperature waste heat. It should be considered in judging the effect of the extra burner 3.2 on the current index of the BTPS that post-combustion has a favourable impact on the loss in the chimney and the thermal efficiency factor of the plant, particularly for lean-mix turbo-engines having a high air surplus.

Heat transformer similar to the embodiment of FIG. 1, including a mechanical compressor 4.0, powered by a steam expansion prime mover 4.1 using energy from exhaust gas, and possibly an extra burner 3.2, composed of the compressor 4.0 with the steam expansion prime mover 4.1 coupled thereto, without any mechanical extra drive 4.2, but adapted to be combined with the extra burner 3.2 according to claim 2 if there is a deficiency of driving energy. This embodiment which comes closest to the main claim 1 offers itself best if energy distribution to the high-temperature and low-temperature waste heat is beneficial and the compression ratio is moderate due to a heating media pressure not being too high, on one hand, and high pressure in the low-pressure boiler 2.0, on the other, as is the case to a particular extent if the plant is designed according to claims 7 to 15. This also meets the prerequistes for using the cost-effective and rugged variant of an integrated reciprocating-piston expansion and compression engine with no crankshaft according to claim 20 which is only composed of expansion and compression pistons directly coupled via common piston rods in cylinders disposed in an axially true alignment, and which does not afford any possibility of an additional mechanical accessory drive.

Heat transformer according to FIG. 2.2 including a mechanical compressor 4.0, powered by a steam expansion prime mover 4.1 using an extra combustion engine 4.2.2 according to claim 23, composed of the compressor 4.0 including the steam expansion prime mover 4.1 firmly coupled thereto and the combustion motor 4.2.2 coupled thereto in a speed-dependent manner the waste heat of which, according to claim 23, is recuperated in parallel with that of the BTPS engine 1.0 by the structural units 2 and 3 of the heat transformer and is fed to the heating boiler 5.0 through the vapour compression plant 4.0 to 4.3. The combustion engine 4.2.2, in contrast to providing the additional driving energy by the extra burner 3.2, which is omitted this arrangement, has the advantage that, as a result of its mechanical efficiency factor which is three to four times higher as compared to the steam expansion prime mover, correspondingly less fuel needs to be used the waste heat utilization of which has an adverse effect on the current index of the BTPS. This holds true all the more so because the exhaust gas energy of the combustion engine 1.0 is integrated into high-pressure motive-steam generation, increases the power of the steam expansion prime mover 4.1 and, thus, leads to rating a lower power for the combustion engine 1.0.

Heat transformer similar to FIG. 1, including a mechanical compressor 4.0, powered by a steam expansion prime mover 4.1 using a mechanical accessory drive, according to claim 21 composed of the compressor 4.0 including the steam expansion prime mover 4.1 and an accessory drive 4.2 coupled thereto. Coupling it to a secondary drive of the BTPS engine 1.0 in a directly mechanical manner is interesting as to the construction expenditure and the efficiency factor, but poses problems if power control of the compressor 4.0 is effected via its number of revolutions. More practicable is an accessory drive by a hydraulic motor 4.2 the speed of which is adjustable and presents less constraints as to the spatial association of the machines. Since the hydraulic motor 4.2 branches power off the BTPS engine the generator 1.1 could be designed smaller theoretically in order to save investment costs. However, this consideration is realistic only on the precondition that at least the proportion of the accessory driving power of the vapour compressor 4.0 by which the generator power has been diminished is always coupled out hydraulically when the BTPS operates under a full load. Considering the possible option to temporarily reduce the vapour load and, hence, the power demand of the compressor 4.0 by direct consumption of low-temperature heat according to claim 12 at least this motive for choosing a hydraulic drive will move to the field of theory. Of course, the standard solution is a directly flanged-on electric motor 4.2 according to FIG. 1 the speed and power of which is varied via frequency converters and the efficiency factor and the construction expenditure of which requires to be compared in the particular case 1:1 to that of a hydraulic motor. The flexibility required to efficiently utilize the rationalization potential according to claim 12, however, is only gained by realizing the configuration according to claim 22 which is described below.

Heat transformer according to FIG. 2.3, including a mechanical compressor 4.0 with an electric motor 4.2 which is supplied with current from a generator 4.4 of the steam expansion prime mover 4.1, according to claim 22 composed of the compressor 4.0 powered by the electric motor 4.2 which is no longer coupled mechanically to the steam expansion prime mover 4.1 as was the case according to claim 1, but is coupled electrically to the current generator 4.4 via the load management 4.5. The electric motor 4.2 fitted with a speed controller only consumes such a volume of the current produced in the generator 4.4 as is required for powering the compressor 4.0 because of the vapour surplus in the low-pressure boiler 2.0 according to the ratio of the low-temperature heat volumes which are produced in the engine 1.0 and are withdrawn via the heating circuits 2.4 and 2.4. The current produced in excess thereof from waste heat in the generator 4.4 of the steam expansion prime mover 4.1 increases the electrical efficiency factor and the current index of the BTPS plant. It is only this advantageous arrangement according to claim 22 which makes it possible to convert excessive expansion energy into additional power/heat coupling current by a temporary direct consumption of recuperated low-temperature heat according to claim 12. If the high-pressure boiler 3.0 and the steam expansion prime mover 4.1 are designed with a power reserve the extra burner 3.2 may be operated in periods of high in-plant power demand exceeding the waste heat supply of the BTPS and meeting the above-average temporary heat demand may be combined with additional electric power generation. Therefore, considering the specific circumstances of an application of a BTPS plant it may be useful, according to the wording of claim 22, to combine the electric drive of the vapour compressor 4.0 mechanically uncoupled from the steam expansion prime mover 4.1 with installing the extra burner 3.2 according to claim 2. Structural Unit 5:

The heating power medium-pressure boiler of the heat transformer is composed of the boiler 5.0 designed for the saturation pressure of the in-plant heating media, which not necessarily needs to be equipped with exhaust gas heating surfaces as it is fed by introducing the steam compressed in the vapour compressor 4.0 from the low-pressure boiler 2.0 and the steam decompressed in the steam expansion prime mover 4.1 from the high-pressure boiler 3.0, which needs to be condensed as far as the volume produced exceeds the consumption in the in-plant heating circuits 5.1 and 5.2. The boiler 5.0 has the function of a waste heat accumulator reacting to differences between the heat produced and heat consumed with pressure variations which, according to the invention, constitute the central reference setting for the load control of the BTPS and parallel-connected additional heat supply plants.

An equipment and connection variant of the boiler 5.0 according to FIG. 3.1 and FIG. 3.2 is formed if the heat transformer is designed with a heat pump low-boiling working medium according to claims 5, 6, and 19 because it will then have to be provided with heat exchange surfaces to condense the compressed working medium, and with a feed water supply because of the heating steam generation by the heat fed.

Connection and function variants of structural units 2, 3, and 5 according to FIG. 4.1 and FIG. 4.2 including a Stirling engine 4.8.0 to power the vapour compressor 4.0 according to claim 24. In this case, the high-pressure boiler 3.0 and the superheater 3.1 are replaced with a driving high-temperature heat exchanger 4.8.1 of the Stirling engine 4.8.0, and connected downstream of the exhaust gas aftercooler/feed water precooler or economizer 3.0, which is still supplied as before by the feed pump 3.4 from the engine cooling circuit return line of the low-pressure boiler 2.0 and now opens into boiler 5.0, is another exhaust gas precooler 5.3 connected by the circulation pump 5.4. A high-temperature cooling circuit including the circulation pump 5.4 transfers the waste heat of the driving low-temperature heat exchanger 4.82. of the Stirling engine 4.8.0, in parallel with the one of the exhaust gas precooler 5.3, to the medium-pressure boiler 5.0 the other functions of which correspond to those described in the preceding para. The solutions according to the process and device claims 2 and 17 to 23, which are shown and discussed with a view to balancing any energy deficiencies in the engine exhaust gas for the steam expansion prime mover 4. 1, apply in a similar way to the Stirling motor 4.8.0. FIG. 4.1 refers to water as a heat pump working media as FIGS. 1 and 2.1 to 2.3 do. FIG. 4.2 shows the equipment and connection as results similarly to FIG. 3.1 when the heat transformer is operated with a heat pump low-boiling working media according to claims 5, 6, and 19 if a Stirling motor 4.8.0 is employed in lieu of the steam expansion prime mover 4.1.

Consequences of choosing the working medium for low-temperature vapour evaporation and compression for the connection and function of the heat transformer. If an engine 1.0 which is hot-cooled at 115 to 125° C. is employed to power a BTPS according to claim 7 the low-pressure boiler 2.0 operates with water as a working medium at 1.7 to 2.4 bar and is protected so well against the penetration of air or oil that the heat exchanger 1.7 leading to the cylinder cooling circuit of the engine 1.0 may be omitted unless particular, extreme in-plant safety requirements with regard to an absolute freedom from oil and contaminants of the heating medium speak in disfavour thereof. The heat transformer is "open" from engine cooling to in-plant heating, energy-absorbing temperature differentials are avoided on heat exchangers for media separation, the water circuits may be designed with the point of view of optimum heat recuperation in the inventive, advantageous manner according to FIG. 1.

The introduction of the relatively cold, freshly treated feed water and all condensates produced in the plant into an inflow line from the low-pressure boiler 2.0 into the engine cooling circuit pump 1.8 as is provided according to claim 11 is advantageous because the supercooling of the cooling-water feed flow below the saturation temperature of the low-pressure boiler 2.0 also diminishes the superheating of the cooling-water return flow by the same amount and the vapour volume in expansion and, hence, the load acting on and the power demand of the vapour compressor 4.0 are reduced.

On the other hand, it is advantageous, according to claim 16, to withdraw superheated cooling water from the return line ahead of the reducing valve 2.2 in order to feed the economiser 3.3 for the high-pressure boiler 3.0 with a view to shift as much heat as possible even here from the low-pressure to the high-pressure range without placing any load on the vapour compressor 4.0.

The relief of the vapour compressor 4.0 is also served by the direct consumption of low-temperature heat by the heating circuits 2.4 and 2.5 fed from the low-pressure boiler 2.0 according to claim 12. It should be restrictively noted here with reference to the explanations on claim 22, however, that reliefs which do not occur permanently or in a firm relationship to the respective plant output, but present themselves temporarily and randomly, will cause an economic benefit only if the vapour compression plant according to claim 22 is composed of separate, independently controllable units including the generator 4.4 and the electric motor 4.2.

If a lower-boiling liquid has to be chosen as a heat pump working media, which is neither admissible as a motor coolant nor is in question as an in-plant heating medium and because a hot-cooled BTPS engine according to claim 4 is unavailable to the vapour evaporation and compression area of the heat transformer the heat transformer, according to claim 6, requires to be designed closed towards either side, i.e. the engine and the plant, it being dependent on the hazard-causing properties of the heat pump working medium (combustibility, toxicity) whether the media-separating points which then are necessary require to be spread over the plant or to be centrally disposed in a protected zone.

In order to maintain the advantageous connections according to claims 11, 12, and 16 despite these factual constraints and to restrict the area of distribution of the low-boiling heat pump working media to an unavoidable extent the low-pressure boiler 2.0, according to claim 6 and as shown in FIG. 3.1, is equipped as an evaporator and the medium-pressure boiler 5.0 as a condenser of a closed heat pump system with heat exchangers disposed between the heat pump low-boiling working media and the in-plant cooling and heating circuits and the expansion steam from the prime mover 4.1 and the compressed heat pump working-medium steam from the vapour compressor 4.2 are separately led to the boiler 5.0 and are caused to exchange heat at the media separation point 4.7. The heat pump working media condensate is provisionally stored in the accumulator 4.6 and, after undergoing expansion in the control valve 4.5, is repassed into the heat pump evaporator on or in the low-pressure boiler 2.0.

If a heat pump working medium can be employed the use of which is unharmful as an engine coolant the heat pump system according to claim 5 is designed open towards the engine cooling circuit, which has the advantage that a media separating point having the temperature differential inevitable in heat exchange is avoided. In this case, the water circuits according to claims 11, 12, and 16 have to be supplied directly or in dependence on the local conditions from the in-plant feed water and condensate tank via an intermediate tank. Since the low-pressure boiler 2.0 does not contain water on the liquid and steam sides in this arrangement, but only contains the heat pump working media which presumably is incompatible with operation the users of in-plant heat have to be fed directly from the low-temperature range according to claim 12 for the purpose of media separation via a heat exchanger which causes an additional temperature differential which, however, is compensated due to the fact that the heat exchange of the heat pump working medium as against the engine cooling circuit and the low-pressure boiler 2.0 is omitted in contrast to the embodiment according to claim 6, which fact results in the additional advantage of a higher evaporation pressure of the working medium, the consequence being a lower power demand of the vapour compressor 4.0.

Summarizing, what can be stated on the subject of a completely or partly closed heat pump using a low-boiling working media is as follows: It is quite possible technically to design such a plant also using engine cooling temperatures below 100° C. without a drop below the ambient pressure in the low-temperature range of the heat transformer in contrast with claim 3.
1. In a tendency, the differential between the engine cooling circuit and the inplant heating circuit temperatures which, in the embodiment according to claim 6, is slightly increased as against the one according to claim 5, causes the pressure differential and the power demand of the vapour compressor 4.0 of the heat pump to rise as well.
2. The tendency of a rising power demand for the vapour compressor 4.0 is further intensified by the increased recovery of low-temperature waste heat because of the colder engine cooling circuits. If and as far as additional recuperated waste heat is concerned here, which gets lost in hot-cooled engines, an advantage can be seen therein but, unfortunately, this prerequisite only applies under certain conditions and to a small proportion. Namely, if there is a success, as expected, in incorporating the waste heat of the oil cooler into recuperation even in hot-cooled engines according to claim 10 and in dispensing with the "cooling-off" of the charging-air heat produced below the cooling circuit temperature according to claim 9 the heat not dissipated with cooling water at a low temperature will be refound in the exhaust gas, is recovered in the high-pressure boiler 3.0 or the high-temperature driving heat exchanger 4.8.1 of the Stirling engine and adds to the energy supply of the vapour compressor drive.
3. Contrary to paras 2 and 3, however, it may be pointed out in favour of the cold-cooled engines and, hence, the plant concepts according to claims 5 and 6 that they can be realized by a much larger selection of engines available today than the hot-cooling concept can be and that the higher energy demand for vapour compression and the smaller supply of exhaust gas heat utilizable for driving the compressor is fully or at least largely compensated by a mechanical/electrical efficiency factor of cold-cooled motors which is higher by between 3 and 5% and by the purchase prices thereof which are more favourable because of their higher specific power. Namely, as far as more current is generated because of the better efficiency factor at the same fuel throughput this one or a part thereof may be used to meet the increased energy demand for vapour compression without deteriorating the overall efficiency factor and the current index on balance.
4. Summarizing, it may be stated that the inventive concepts of BTPS including a heat transformer in both the versions for hot-cooling engines using water as a heat pump working medium and the versions for cold-cooled engines using heat pump low-boiling working media represent advantageous improvements of the BTPS plants with or without a heat transformer according to the state of the art.

What is claimed is:
1. A process of heat transformation to convert the low-temperature waste heat from cooling circuits of block-type thermal power station (BTPS) reciprocating-piston combustion engines into steam or other heating media of a temperature required for operation by adopting the principle of the high-temperature heat pump according to which the low-temperature heat produced by recooling the engine cooling circuits to their required inflow temperature
   is transferred to a liquid working medium,
   is absorbed by the resultant working media vapours by working media partial evaporation,
   is brought, by compressing the working medium vapours from the low evaporation pressure conditioned by the recooling temperature of the engine cooling circuits, to a higher condensation pressure as is required for the transmission of heat to the inplant heating medium and is conditioned by the saturation pressure for the desired temperature of the in-plant heating medium,
   and is transferred by condensation to the in-plant heating medium, characterized in that the energy required for the compression of the working-medium vapours is fed fully or in part by means of a mechanical compressor utilizing the exhaust gas heat content of the BTPS reciprocating-piston combustion engine.

2. The process according to claim 1, characterized in that a possible deficiency of the energy required for vapour compression is balanced out by firing additional fuel (B) in the engine exhaust gas.

3. The process according to claim 1 characterized in that the low-temperature waste heat is incorporated into heat transformation only in as far as it is produced at temperatures to which the cooling circuits may be recooled by partial evaporation of a working medium without any drop below the ambient pressure in any point or at any operating condition of the heat transformer at the saturation pressures of the working medium which thereby occur.

4. The process according to claim 3, characterized in that a working medium such as methanol or ethanol is employed to cool the engine and the heat pump, the boiling point of which medium is so low that when used in BTPS engines the cooling circuits of which are designed for a low inflow temperature due to construction no drop below the ambient pressure will occur in any point or at any operating condition of the heat transformer in recooling the working medium by partial evaporation and vapour compression.

5. The process according to claim 4, characterized in that media separation between the working medium for engine cooling and the heat pump and the in-plant heating medium, which is water or steam, is performed in the medium-pressure range of the heat transformer during the heat transfer from the condensing vapours of the working medium to the in-plant heating medium.

6. The process according to claim 5, characterized in that water is used as a working medium for engine cooling and a low-pressure boiler (2.9) and the recooling of which medium is effected by heat exchange with the working medium of the heat pump at an additional media separation point in the area of the low-pressure boiler (2.0) of the heat transformer.

7. The process according to claim 6, characterized in that the cooling of the charging air/fuel mix (A) heated in a turbo-supercharger (1.3) is divided into precooling and aftercooling in such a way that the proproportion of the waste thermal output which is produced sufficiently far above the saturation temperature of the working medium in a precooler (1.4) may be incorporated into recooling by heat transformation.

8. The process according to claim 6, characterized in that the recooling of the air/fuel mix (A) heated in the turbo-supercharger (1.3) below the temperature achievable in the precooler (1.4) is dispensed with.

9. The process according to claim 6, characterized in that the choice of the engine oil and/or the construction type of the lubricating-oil circuits of BTPS engines makes admissible an engine oil inflow temperature which is high enough to enable the waste heat produced therein to be fully incorporated in heat recovery by the heat transformer.

10. The process according to claim 6, characterized in that fresh boiler feed water and heating steam condensate (D) are fed to an afflux line from the low-pressure boiler (2.0) to a cooling-water pump (1.8).

11. The process according to claim 6, characterized in that inplant heat users which may be sufficiently heated by working medium liquid or steam from the low-pressure boiler (2.0) are directly supplied therewith.

12. The process according to claim 6, characterized in that all of the cooling circuits are connected in parallel with respect to the heat pump working medium.

13. The process according to claim 6, characterized in that the energy required for vapour compression is provided by an expansion of the steam produced from the exhaust gas heat of the BTPS engine at a pressure higher than the one required to heat the plant in a waste-heat boiler (high-pressure boiler) (3.0) up to the saturation pressure for the temperature of the in-plant heating medium.

14. The process according to claim 6, characterized in that the high-pressure steam is superheated so that its expansion is performed at a working efficiency which is as high as possible.

15. The process according to claim 6, characterized in that the feed water of the waste heat boiler (high-pressure boiler) (3.0) fired by engine exhaust gas is withdrawn from a return line from the engine cooling circuits to the low-pressure boiler (2.0) still before reaching a pressure-maintaining valve (2.2) and is preheated by exhaust gas cooling in an economiser (3.3).

16. The process according to claim 3, characterized in that hot-cooled BTPS engines are employed for the cylinder cooling circuit of which where the preponderant output of waste heat is produced an inflow temperature is admissible which is so far above 100° C. that water may be used as a working medium of the pump and may be employed to operate the whole plant from the engine cooling circuits via the heat pump to the in-plant heating circuits without any media separation and without any drop of the ambient pressure below its level.

17. The device for realizing the process according to claim 1, to use the motive steam for vapour compression which is generated from the energy of the engine exhaust gas and, if required, from an extra fuel (B) fired in a burner (3.2) in the high-pressure boiler (3.0) and is superheated in a superheater (3.1), characterized in that vapour compression is performed by means of a mechanical compressor (4.0) which is powered by a steam expansion prime mover (4.1) the expanded motive steam of which, along with the compressed vapours, is led to a heating-steam medium-pressure boiler (5.0) of the heat transformer to undergo further use in in-plant heating (FIG. 1, FIGS. 2.1 to 2.3).

18. The device according to claim 17, characterized in that a strongly simplified vapour compressor (4.0) driven by steam expansion at a controlled number of strokes is used which, dispensing with a crankshaft, remains only composed of expansion and compression pistons directly coupled via common piston rods, and a inlet and outlet control for the driving steam and the vapours.

19. The device according to claim 17, characterized in that if exhaust gas energy is lacking an extra drive (4.2) which is electric or is coupled hydraulically or mechanically to the BTPS engine (1.0) is provided in lieu of generating additional motive steam by means of the burner (3.2) for the steam expansion prime mover (4.1) (FIG. 3.1; FIG. 3.2).

20. The device according to claim 19, characterized in that the extra drive (4.2) of the vapour compressor (4.0) consists in a combustion motor the waste heat of which is processed by the heat transformer with that of the BTPS engine (1.0).

21. The device according to claim 17, characterized in that if exhaust gas energy is lacking, in lieu of or in addition to generating additional motive steam by means of the burner (3.2), the vapour compressor (4.0) equipped with an electric motor (4.2) is uncoupled mechanically from the steam expansion prime mover (4.1) which generates power by means of
 an electric generator (4.4) while fully utilizing the produced high-pressure steam for driving the vapour compressor (4.0) independently controlled with regard to the output and the number of revolutions the temporary surplus of which power is fed to the mains by a load management (4.5) in parallel with the output of a BTPS generator (1.1) (FIG. 2.3).

22. The device for realizing the process according to claim 1, use the motive steam for vapour compression which is generated from the energy of the engine exhaust gas and, if required, from an extra fuel (B) fired in a burner (3.2) in the high-pressure boiler (3.0) and is superheated in the superheater (3.1), characterized in that the compression of the working-medium vapour incompatible with in-plant heating is performed by means of a mechanical compressor (4.0) which is powered by a steam expansion prime mover (4.1) the expanded motive steam of which is led, separated from the compressed vapours, to the high-pressure boiler (3.0) of the heat transformer to undergo further use in in-plant heating while the compressed working-medium vapours dissipate their energy by condensation to a heat exchanger (4.7) to the water content of the heating-steam medium-pressure boiler (5.0) of the heat transformer and are returned to the low-pressure boiler (2.0) in a liquefied condition (FIG. 3.1; FIG. 3.2).

23. The device for realizing the process according to claim 1, characterized in that, while directly using the exhaust gas energy to drive the vapour compressor (4.0) a Stirling engine (4.8.0) is employed the waste heat of which is processed by the heat transformer with that of the BTPS engine (1.0). (FIG. 4.1; FIG. 4.2).

24. A device for realizing the process of heat transformation to convert the low temperature waste heat from cooling circuits of block-type thermal power station (BTPS) reciprocating-piston combustion engines into steam or other heating media of a temperature required for operation by adopting the principle of the high-temperature heat pump and utilizing the additionally fired fuel from the energy of the exhaust gas and, if required, in a burner according to which the low-temperature heat produced by recooling the engine cooling circuits to their required inflow temperature is transferred to a liquid working medium, is absorbed by the resultant working-media vapours by working media partial evaporation, is brought, by compressing the working medium vapours from the low evaporation pressure conditioned by the recooling temperature of the engine cooling circuits, to a higher condensation pressure as is required for the transmission of heat to the in-plant heating medium and is conditioned by the saturation pressure for the desired temperature of the in-plant medium, and is transferred by condensation to the in-plant heating medium, and according to which the energy of the exhaust gas is used for compressing the working-medium vapours, including a reciprocating-piston combustion engine (1.0) with a electric generator (1.1) coupled thereto, with a heat transformer composed of engine cooling circuits for charging air and/or a mix (1.4, 1.5), engine oil (1.6), and cylinders which dissipate their heat into a low-pressure boiler (2.0) via a working liquid, further composed of a motive-steam high-pressure boiler including a waste-heat steam generator (3.0), a superheater (3.1) connected upstream thereof on the exhaust-gas side and a feed water preheater (3.3) connected downstream thereof, and including a medium-pressure heating boiler (5.0) which is fired with working-medium vapours from the low pressure boiler (2.0) which undergo compression via a vapour compressor (4.0) operated by the superheated motive steam from the superheater (3.1), characterized in that a steam jet compressor (4.0.1) is used the expanded motive steam of which, along with the compressed vapours, is passed into the heating-steam medium-pressure boiler (5.0) of the heat transformer for further use for heating the plant (FIG. 2.1).

25. A process of heat transformation to convert the low-temperature waste heat from cooling circuits of block-type thermal power station (BTPS) reciprocating-piston combustion engines into steam or other heating media of a temperature required for operation by adopting the principle of the high-temperature heat-pump wherein the low-temperature heat is produced at temperatures to which the cooling circuits may be recooled by partial evaporation of a working medium without any drop below the ambient pressure in any point or at any operating condition of the heat transformer at the saturation pressures of the working medium which thereby occur, according to which the low-temperature heat produced by recooling the engine cooling circuits to their required inflow temperature, is transferred to a liquid working medium,
is absorbed by the resultant working media vapours by working media partial evaporation,
is brought, by compressing the working medium vapours from the low evaporation pressure conditioned by the recooling temperature of the engine cooling circuits, to a higher condensation pressure as is required for the transmission of heat to the in-plant heating medium and is conditioned by the saturation pressure for the desired temperature of the in-plant heating medium,
and is transferred by condensation to the in-plant heating medium, characterized in that the energy required for the compression of the working-medium vapours is fed fully or in part by means of a mechanical compressor utilizing the exhaust gas heat content of the BTPS reciprocating-piston combustion engine,
wherein the BTPS are employed for the cylinder cooling circuit where the preponderant output of waste heat is produced by an inflow temperature which is so far above 100° Celsius that water may be used as the working medium of the heat pump and may be employed to operate a plant from the engine cooling circuits via the heat pump to in-plant heating circuits without any media separation and without any drop of the ambient pressure below its level.

26. The process according to claim 25, characterized in that the cooling of the charging air/fuel mix (A) heated in a turbo-supercharger (1.3) is divided into precooling and aftercooling in such a way that the proportion of the waste thermal output which is produced sufficiently far above the saturation temperature of the working medium in a precooler (1.4) may be incorporated into recooling by heat transformation.

27. The process according to any one of claim 25, characterized in that the recooling of the air/fuel mix (A) heated in the turbo-supercharger (1.3) below the temperature achievable in the precooler (1.4) is dispensed with.

28. The process according to any one of claim 25, characterized in that the choice of the engine oil and/or the construction type of the lubricating-oil circuits of BTPS engines makes admissible an engine oil inflow temperature which is high enough to enable the waste heat produced therein to be fully incorporated in heat recovery by the heat transformer.

29. The process according to any one of claim 25, characterized in that fresh boiler feed water and heating steam condensate (D) are fed to an afflux line from the low-pressure boiler (2.0) to a cooling-water pump (1.8).

30. The process according to any one of claim 25, characterized in that in-plant heat users which may be sufficiently heated by working medium liquid or steam from the low-pressure boiler (2.0) are directly supplied therewith.

31. The process according to any one of claim 25, characterized in that all of the cooling circuits are connected in parallel with respect to the heat pump working medium.

32. The process according to any one of claim 25, characterized in that the energy required for vapour compression is provided by an expansion of the steam produced from the exhaust gas heat of the BTPS engine at a pressure higher than the one required to heat the plant in a waste-heat boiler (high-pressure boiler) (3.0) up to the saturation pressure for the temperature of the in-plant heating medium.

33. The process according to any one of claims 25, characterized in that the high-pressure steam is superheated so that its expansion is performed at a working efficiency which is as high as possible.

34. The process according to any one of claims 25, characterized in that the feed water of the waste heat boiler (high-pressure boiler) (3.0) fired by engine exhaust gas is withdrawn from a return line from the engine cooling circuits to the low-pressure boiler (2.0) still before reaching a pressure-maintaining valve (2.2) and is preheated by exhaust gas cooling in an economiser (3.3).

* * * * *